(12) United States Patent
Scholefield et al.

(10) Patent No.: US 11,248,959 B2
(45) Date of Patent: Feb. 15, 2022

(54) MULTI-SPECTRAL IMAGE PRINTING METHOD

(71) Applicant: ECOLE POLYTECHNIQUE FEDERALE DE LAUSANNE (EPFL), Lausanne (CH)

(72) Inventors: Adam Scholefield, Lausanne (CH); Martin Vetterli, Grandvaux (CH); Yves Bellouard, Lutry (CH); Michalina Pacholska, Lausanne (CH); Gilles Baechler, St-Sulpice (CH); Arnaud Latty, Brugg (CH)

(73) Assignee: ECOLE POLYTECHNIQUE FÉDÉRALE DE LAUSANNE (EPFL), Lausanne (CH)

( * ) Notice: Subject to any disclaimer, the term of this patent is extended or adjusted under 35 U.S.C. 154(b) by 0 days.

(21) Appl. No.: 16/757,232

(22) PCT Filed: Oct. 22, 2018

(86) PCT No.: PCT/IB2018/058196
§ 371 (c)(1),
(2) Date: Apr. 17, 2020

(87) PCT Pub. No.: WO2019/077589
PCT Pub. Date: Apr. 25, 2019

(65) Prior Publication Data
US 2020/0278251 A1   Sep. 3, 2020

(30) Foreign Application Priority Data

Oct. 20, 2017   (WO) .................. PCT/IB2017/056544

(51) Int. Cl.
| G01B 9/02 | (2006.01) |
| G01J 3/28 | (2006.01) |
| G01J 3/14 | (2006.01) |

(52) U.S. Cl.
CPC ............... G01J 3/2823 (2013.01); G01J 3/14 (2013.01); G01J 2003/2826 (2013.01)

(58) Field of Classification Search
CPC . G01J 3/453; G01J 3/2823; G01J 3/02; G01B 9/02; G01N 21/4795
(Continued)

(56) References Cited

U.S. PATENT DOCUMENTS

2002/0076655 A1   6/2002   Borrelli et al.
2007/0165976 A1   7/2007   Arbab et al.
(Continued)

FOREIGN PATENT DOCUMENTS

EP   1 527 363   5/2005

OTHER PUBLICATIONS

Bjelkhagen, Hans I., "Super-realistic-looking images based on colour holography and Lippmann photography," The International Society for Optical Engineering, 2002, 13 pages.
(Continued)

*Primary Examiner* — Md M Rahman
(74) *Attorney, Agent, or Firm* — Nixon & Vanderhye P.C.

(57) ABSTRACT

The present disclosure concerns a multi-spectral image printing method. The method includes the steps of:—providing a multi-spectral image;—providing a material;—determining changes in a refractive index value of the material permitting to reproduce the multi-spectral image when the material is illuminated; and—generating the changes in refractive index value in the material.

20 Claims, 4 Drawing Sheets

(58) Field of Classification Search
USPC .......................................................... 356/456
See application file for complete search history.

(56) References Cited

U.S. PATENT DOCUMENTS

2017/0299434 A1* 10/2017 Hu ........................ G01J 3/0208
2019/0285473 A1* 9/2019 Hu ........................ G01J 3/2823

OTHER PUBLICATIONS

Bjelkhagen, Hans I., "Lippmann photography: its history and recent development," The PhotoHistorian, 2003, 11 pages.

Bjelkhagen, Hans I., et al., Ultra-Realistic Imaging: Advanced Techniques in Analogue and Digital Colour Holography, Chapter 2 Lippmann Photography, CRC Press, 2013, pp. 41-69.

Canioni, Lionel, et al., "Three-dimensional optical data storage using third-harmonic generation in silver zinc phosphate glass," Optics Letters, vol. 33, No. 4, Feb. 15, 2008, pp. 360-362.

Fournier, Jean-Marc R., et al., "Recent developments in Lippmann photography," SPIE, vol. 3358, Sixth International Symposium on Display Holography, 1998, pp. 95-102.

Glezer, E. N., et al., "Three-dimensional optical storage inside transparent materials," Optics Letters, vol. 21, No. 24, Dec. 15, 1996, pp. 2023-2025.

Ives, Herbert E., "An Experimental Study of the Lippmann Color Photograph," Johns Hopkins University, Mar. 1908, pp. 325-352.

Lippmann, G., "La photographie des couleurs," Comptes Rendus Hebdomadaires à l'Académie Des Sciences, vol. 112, 1891, pp. 274-275.

Lippmann, G., "Sur la théorie de la photographie des couleurs simples et composées par la méthode interferentielle," Journal de Physique Théorique Appliquée, vol. 3, No. 1, 1894, pp. 97-107.

Marshall, Graham D., et al., "Direct laser written waveguide-Bragg gratings in bulk fused silica," Optics Letters, vol. 31, No. 18, Sep. 15, 2006, pp. 2690-2691.

Marshall, Graham D., et al., "Point-by-point written fiber-Bragg gratings and their application in complex grating designs," Optics Express, vol. 18, No. 19, Sep. 13, 2010, pp. 19844-19859.

Maruo, Shoji, et al., "Three-dimensional microfabrication by use of single-photon-absorbed polymerization," Applied Physics Letters, vol. 76, No. 19, May 8, 2000, pp. 2656-2658.

Nareid, Helge, et al., "Modeling of the Lippmann color process," J. Opt. Soc. Am. A, vol. 8, No. 2, Feb. 1991, pp. 257-265.

Saleh, B. E. A., et al., Fundamentals of Photonics, vol. 22, Wiley New York, 1991, pp. 26-35 and 98-100.

Thiel, M., et al., "Direct laser writing of three-dimensional submicron structures using a continuous-wave laser at 532 nm," Applied Physics Letters 97, 2010, pp. 221102-1-221102-3.

Zhang, Jingyu, et al., "Seemingly Unlimited Lifetime Data Storage in Nanostructured Glass," Physical Review Letters, vol. 112, Jan. 24, 2014, pp. 033901-1-033901-5.

Zhang, J., et al., "Eternal 5D data storage by ultrafast laser writing in glass," Proceedings of SPIE, vol. 9736, pp. 97360U-1-97360U-16.

International Search Report for PCT/IB2018/058196 dated Jan. 24, 2019, 5 pages.

Written Opinion of the ISA for PCT/IB2018/058196 dated Jan. 24, 2019, 6 pages.

* cited by examiner

MULTI-SPECTRAL IMAGE PRINTING METHOD

CROSS-REFERENCE TO RELATED APPLICATIONS

This application is the U.S. national phase of International Application No. PCT/IB2018/058196 filed Oct. 22, 2018 which designated the U.S. and claims priority to PCT/IB2017/056544 filed Oct. 20, 2017, the entire contents of each of which are hereby incorporated by reference.

FIELD OF THE INVENTION

The present disclosure concerns a method and system to digitally store a multispectral image in extremely durable materials, such as fused silica, borosilicates, aluminosilicates, or other family of glass, and crystals that are transparent or partially transparent at the wavelength of the laser used to store the information. The method can also be applied to less durable or degradable materials such as polymers as well as organic materials.

The present disclosure also concerns multispectral printing of images, as the data is stored in such a way that the material reflects the stored multi-spectral image.

The present disclosure in particular concerns a novel approach to print multi-spectral images in different substrates as mentioned above and using ultra-fast lasers such as a femtosecond laser. Exemplary applications include information storage in general and security printing, particularly in luxury goods.

BACKGROUND

Lippmann photography, a nineteenth-century Nobel-prize-winning technique, captures and reproduces multi-spectral images [1, 2]. Lippmann photography is similar to holography in the fact that an interference pattern is captured in a 3D photographic emulsion, however, instead of recording the 3D geometry of the scene, Lippmann photography only captures a 2D projection of the scene and the third dimension of the emulsion is used to record spectral information.

As well as being an analog multi-spectral camera, Lippmann photographs have an even more remarkable trick up their sleeve: when a photographed emulsion is illuminated with white light, it reproduces the full spectrum of the original scene. In the original approach described by Lippmann, the desired spectrum is used to encode the information in the plate and, due to artifacts of the process, the reproduced spectrum is not exactly the same as the original but remains a good approximation. In this disclosure, since interference patterns are printed by controlling the focal point of a laser in the substrate, there is more flexibility in the interference patterns that can be printed and thus it is possible to print an interference pattern that reproduces the desired spectrum (almost) exactly.

Some of the advantages of Lippmann's original process compared to traditional techniques include the fact that, in contrast to RGB approaches, this process records the full spectrum and one-hundred-year-old Lippmann plates still show no sign of fading. However, despite these benefits, the technique was barely commercialized. There are a number of reasons for this:

1. viewing the plates is particularly sensitive to the viewing and illumination directions;
2. the plates are very difficult to copy—a useful characteristic for security applications but not for consumer photography;
3. long exposure times are required in the acquisition process.

Since Lippmann's original work there have been a small number of scientific studies analyzing the approach [3, 4, 5, 6, 7]. Lippmann photography can advantageously be used in security applications, as there is no way to edit such a photograph.

Lippmann photography provides a way to store multi-spectral images, such that they reflect the full spectrum of the stored image. In contrast to Lippmann photography that stores an analogue image in a photosensitive emulsion using photochemical principles, the method of the present disclosure uses, for example, ultra-fast lasers to store a digital image in extremely durable materials and accordingly a radically different material photo-inscription mechanism.

Data storage with femtosecond lasers has been demonstrated [see references 8, 9, 10, 11, 12, 13], but not such that they reflect a multi-spectral image.

SUMMARY

It is therefore one aspect of the present disclosure to provide a multi-spectral image printing method. The method preferably includes the steps of:
  providing a multi-spectral image;
  providing a material;
  determining changes in a refractive index value of the material permitting to reproduce the multi-spectral image when the material is illuminated; and
  generating the changes in refractive index value in the material.

According to another aspect, the present disclosure concerns a multi-spectral image printing system including a calculator configured to determine changes in a refractive index value of a material permitting to reproduce a multi-spectral image when the material is illuminated; and refractive index change generating system configured to change refractive index value in the material.

The present disclosure also concerns a material or substrate including the multi-spectral image recorded using the above method.

Other advantageous features can be found in the dependent claims.

The above and other objects, features and advantages of the present invention and the manner of realizing them will become more apparent, and the invention itself will best be understood from a study of the following description with reference to the attached drawings showing some preferred embodiments of the invention.

The present disclosure provides a technique to print multiple reflective layers or levels in different materials, such that, when the material is illuminated with white light for example, the reflection creates a multi-spectral image. The reflections are created by locally modifying the refractive index of the material using, for example, a femtosecond laser.

The method and system of the present disclosure provides a completely new way to print multi-spectral images in a material which are viewable upon illumination of the material in which the image is registered or printed to.

A BRIEF DESCRIPTION OF THE DRAWINGS

The above object, features and other advantages of the present invention will be best understood from the following detailed description in conjunction with the accompanying drawings, in which:

FIG. 1 shows an overview of a process of the present disclosure. A digital 3-D cube of the desired multi-spectral image is algorithmically converted to the desired refractive index pattern to print in the substrate. This desired refractive index pattern is algorithmically converted to a set of controls for the laser, optics and translation axes to print the desired refractive index pattern in the substrate.

FIG. 2 shows different printing regimes. For energies below a threshold, $E_{p1}$, there are no non-linear effects and the substrate is not modified. For energies between $E_{p1}$ and $E_{p2}$, there is a permanent refractive index change inside an ellipse (the longer direction of the ellipse is in the same direction as the incident laser beam). In this region, the ellipsoid size grows as the laser energy is increased. Beyond $E_{p2}$, the material modification enters a different regime. In this third regime, the ellipse contains a grating, whose orientation depends on the laser's polarization.

FIG. 3 shows an example of continuously modified zones in a material as revealed with an atomic force microscope (AFM) thermal conductivity probe. The light was propagating along the long axis of the elliptically shaped laser-modified zones. The size and shape of the laser affected zones can be tuned by selecting appropriate objectives and/or combined with beam shaping techniques.

DETAILED DESCRIPTION OF SEVERAL EMBODIMENTS

The method and system of the present disclosure concerns a technique wherein, given a multi-spectral image, a substrate can be modified so that, when it is illuminated with for example white light, it reproduces the desired multi-spectral image.

The multi-spectral image is, for example, a three-dimensional array of numbers, the three-dimensional array comprising at least one or a plurality of two-dimensional slices, where each two-dimensional slice contains a plurality of pixels defining a discrete two-dimensional image at a particular wavelength, or range of wavelengths.

Each pixel does not necessarily have the same spectral resolution. In this case, the multi-spectral image is not expressed as a 3D cube as such but a 2D array of pixels, where for each pixel there is a vector describing the intensity at different wavelengths, or range of wavelengths. When the vectors are all the same length we have a 3D cube.

Figure 1:
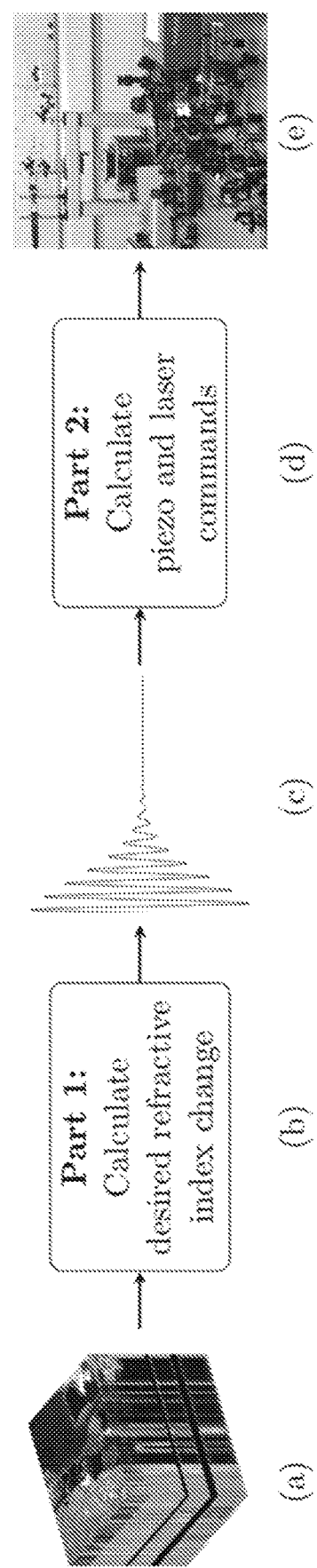

FIG. 1 shows an exemplary overview of the process of the present disclosure.

FIG. 1(a) shows a 3D cube of the desired multi-spectral image. FIG. 1(b) shows an Algorithm configured to calculate the refractive index to print in the substrate (inverse problem). FIG. 1(c) shows the desired refractive index of the material or substrate which will cause the material or substrate to reflect the correct multi-spectral image. FIG. 1(d) shows an Algorithm configured to generate the controls for the optical system of FIG. 1(e) to move a laser focal point through the substrate or material and to turn the laser on/off when needed. FIG. 1(e) shows an optical system comprising a laser, optics and translation axes or mechanisms which will print the image in the substrate or material by modifying the refractive index of the substrate or material.

An ultra-fast laser (i.e. a laser emitting pulses of time duration smaller than a few picoseconds) can be used to locally alter the refractive index of the material or substrate thus allowing to print or register multi-spectral images in the material or substrates.

Advantages of the disclosed approach are:
1. Multi-spectral images (not just RGB) can be printed or registered;
2. Unlike traditional Lippmann photography which records a particular scene, the method and system of the present disclosure makes it possible to print any desired spectrum; covering a broad spectrum than can span from the near-UV to the far infrared spectrum (the latter depends on the substrate transparency spectrum that can be diverse as a wide range of substrates can be used)
3. These images are incredibly difficult to copy;
4. The spatial resolution is extremely high (less than 1 µm×1 µm). Also, as the color information is contained in the depth of the material such as glass, spatial resolution is not lost when printing different colors as is the case in traditional printing.

The multi-spectral image printing or recording method includes providing a multi-spectral image, and a material or substrate in which the image is printed or recorded. The method also includes determining changes in a refractive index value of the material or substrate permitting to reproduce the multi-spectral image when the modified material or substrate is illuminated by a light source. These determined changes in refractive index value are then generated in the material or substrate.

The material or substrate comprises or consists solely of an extremely durable material, for example, fused silica, borosilicates, aluminosilicates, or other family of glass, or crystals that are transparent to the laser wavelength used to store or record the information in the material. The material or substrate may also comprise or consist solely of less durable or degradable materials, for example, a polymer or organic materials. Furthermore, unlike Lippmann's original approach, the substrate does not have to be flat, and for instance, can be a cylinder. It is known in prior art that a laser-beam can be shaped to accommodate the effect of a curved substrate or that so-called 'index-match' fluids can be used to accommodate for the curviness of the substrate.

The changes in refractive index value are generated in the material to cause incident light to be reflected and to interfere in order to produce a desired spectrum or color for points or locations of the image plane of the multi-spectral image.

The changes in refractive index value are generated in the material to produce a plurality of superimposed layers or regions inside the material in which the material refractive index is modified.

The changes in refractive index value are generated using electromagnetic radiation provided, for example, by an ultra-fast laser. The changes in refractive index value can be generated in the depth of the material or substrate and at different depth levels or distances into the material.

The changes in refractive index value in the material or substrate are generated by displacing the laser spot across and in the material to generate the desired refractive index change pattern.

Figure 2:
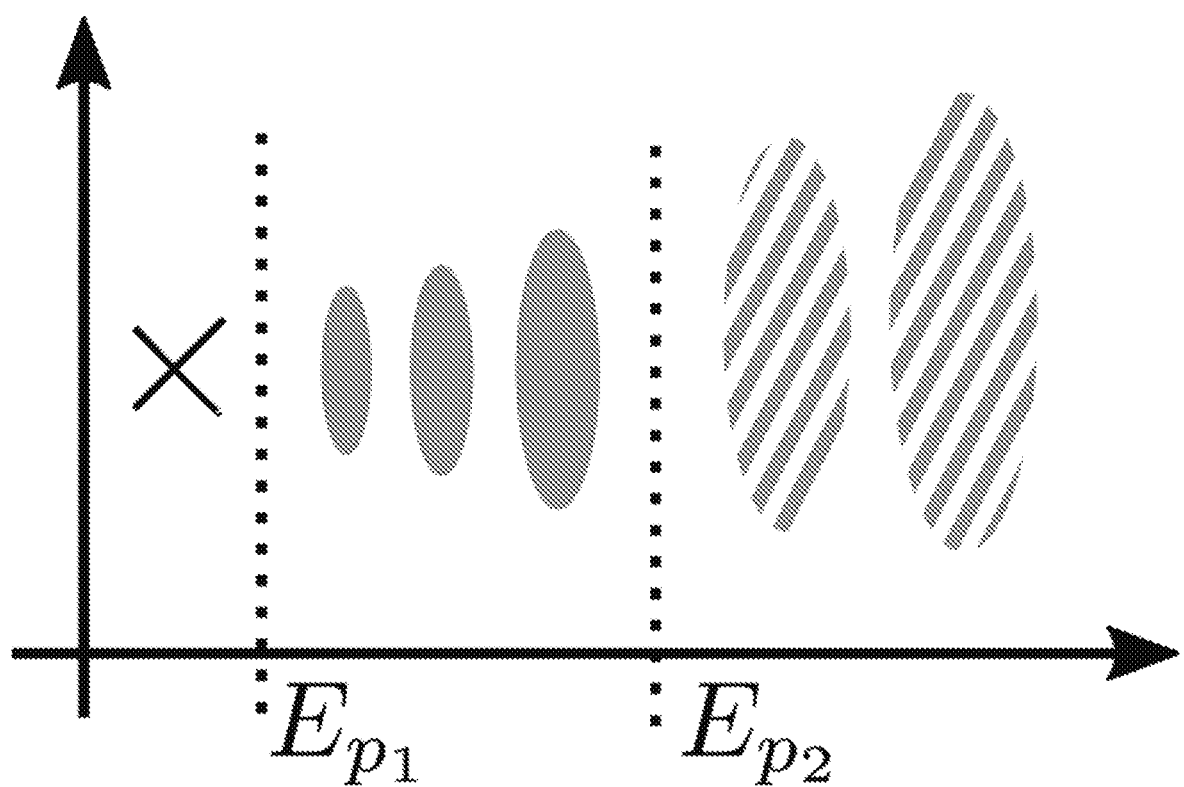
Figure 3:
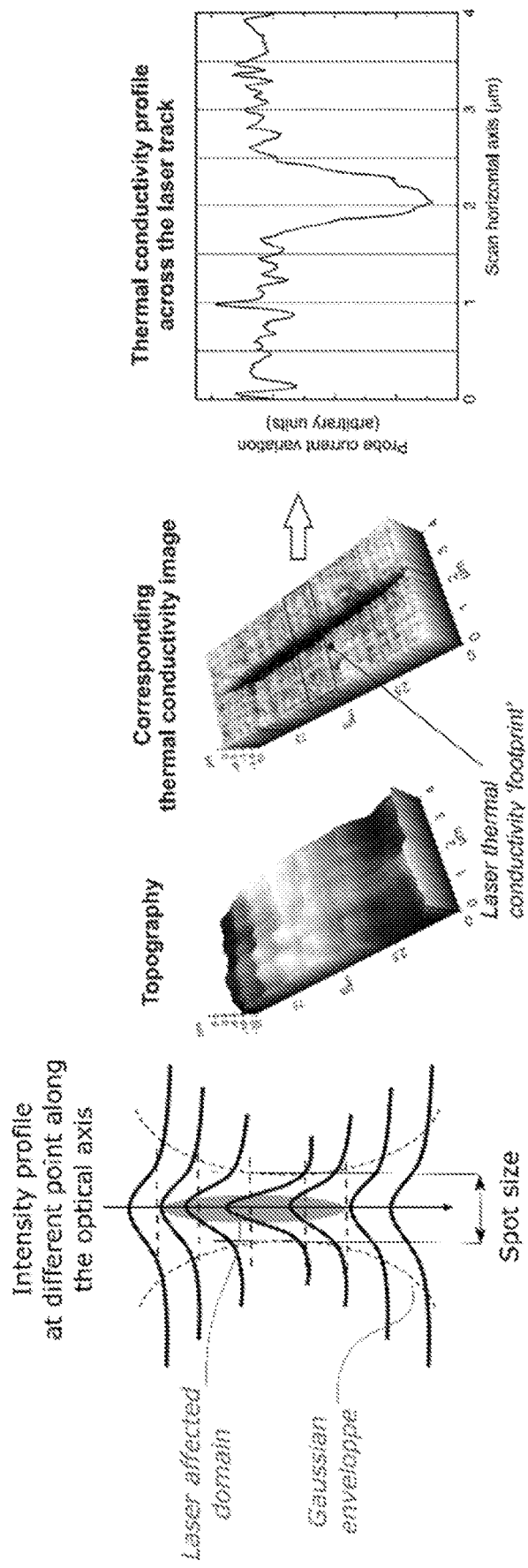
Figure 4:
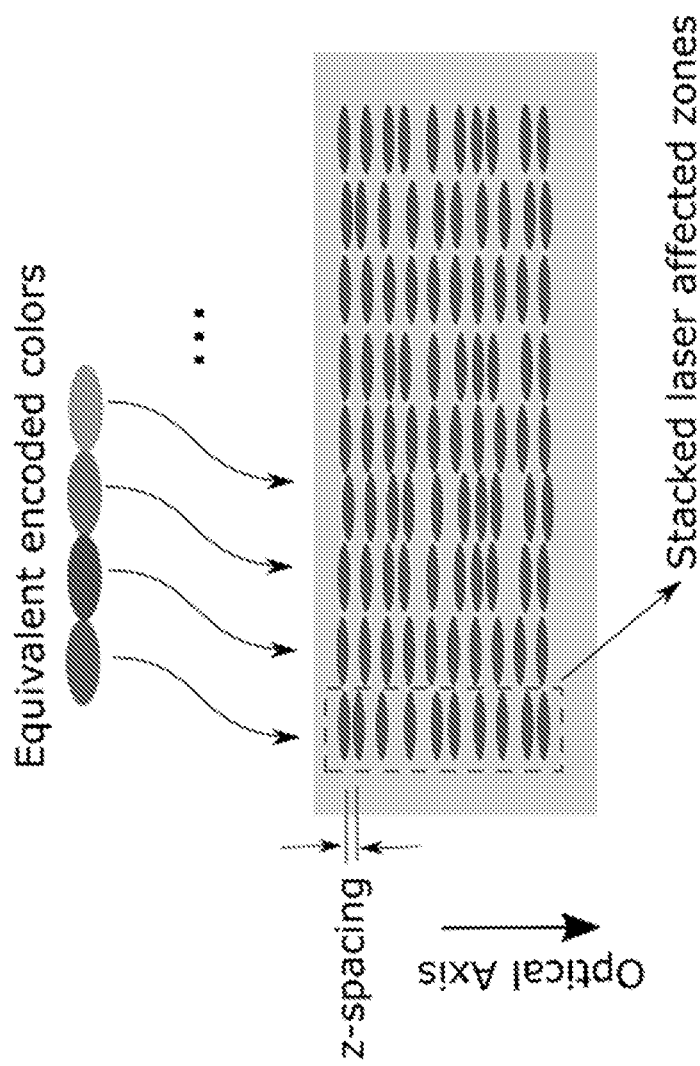
FIG. 4 illustrates the principle of arranging spatially laser affected zones to encode spectral information along the depth of the specimen. Laser affected zones are arranged at varying distances between one another.

The changes in refractive index value are generated in a focal region or area of the laser beam when an energy level in the focal region exceeds a first threshold value, for example, the first threshold value $E_{p1}$ shown in FIG. 2. The power of the laser can be changed to define different printing regimes as schematically shown in FIG. 2. For energies below a threshold, $E_{p1}$, there are no non-linear effects produced and the substrate or material structure is not modified. For energies between $E_{p1}$ and $E_{p2}$, there is a permanent refractive index change to this produced inside an area, for example an ellipse (as illustrated in FIG. 3), formed or defined by the light of the laser beam (the longer direction of the ellipse is in the same direction as the propagating incident laser beam). In this area or region, the ellipsoid size grows as the laser energy is increased. Beyond $E_{p2}$, the material modification enters a different regime. In this third regime, the ellipse defines or contains a grating profile or a modulated energy profile, whose orientation depends on the laser's polarization. Note that this regime of nanogratings present in particular in fused silica is not necessarily present in other materials. Other types of modifications may also be found above the second energy threshold Ep2.

The changes in refractive index value can alternatively be generated in the focal region of the laser when an energy level in the focal region exceeds the second threshold value $E_{p2}$ to define a modulated energy profile having an orientation determined by a polarization of the laser.

The same or a similar change in refractive index value can be generated at different thicknesses inside the material from an outer surface of the material. This permits the reflected intensity at a given wavelength or spectral range to be increased.

The changes in refractive index value in the material or substrate can be generated by providing a plurality of points p on the material and a timestamp t, and displacing the laser spot between the plurality of points in such a way that it will be at a position pn at time nt.

The changes in refractive index value in the material can be generated by displacing the material and laser spot such that the laser focal point or spot visits every point in the material just once. The laser spot can, for example, be displaced in the material in a layer by layer (or thickness level by thickness level) manner from the bottom up in a raster scan style.

The amount of energy deposited at each point or location in the material can, for example, be controlled by varying the speed of movement of the laser spot with the laser pulses being emitted at a constant rate.

The changes in refractive index value required to generate the desired image can be calculated using, for example, the Born approximation method, or using a standard Lippmann model. Refining of the calculated refractive index values or changes in refractive index value can be carried out using a forward model configured to calculate a reflected spectrum from the determined refractive index change.

The multi-spectral image printing or recording system of the present disclosure includes, for example, a calculator or processor configured to determine changes in a refractive index value of a material or substrate permitting to reproduce a multi-spectral image when the material is illuminated by incident light.

The multi-spectral image to be recorded in the material by recording refractive index changes in the material, for example spatially across the material and/or at different depths inside the material, is a known and predetermined image, for example having known spectrum information.

The multi-spectral image printing or recording system also includes a laser for generating the refractive index change in the material or substrate. The laser is, for example, an ultra-fast laser such as a femtosecond laser. In general, it can be a laser that emits pulses shorter in duration than a few picoseconds. Note that longer pulse lasers or even continuous lasers could be used for materials like polymers that may experience a chemical reaction above a given intensity threshold. In such cases, the index modulation is not triggered by multi-photon processes, but rather by a non-linear chemical reaction. Such processes have been demonstrated in three-dimensional lithography in polymers [16, 17].

The multi-spectral image printing or recording system also includes a refractive index change generating system configured to change a refractive index value in the material or substrate.

The refractive index change generating system is configured to displace a focal spot of a laser to different points or depths in the material or substrate to generate the refractive index change at these different points or depths.

The refractive index change generating system can include, for example, a controller, and/or a plurality of mirrors, and/or focusing optics and/or laser beam optics; and displacement stages or positioners configured to displace system elements such as the mirrors and/or focusing optics in order to spatially displace the laser spot in three-dimensions.

The system may, for example, include elements such as a galvanometer scanner, and/or polygon scanner, and/or moving stage that can be actuated with piezoelectric means, linear motors, stepper motors or any suitable means with the required accuracy for encoding the spectral information in the material.

The laser beam optics are, for example, configured to focus the laser intensity so that the intensity is locally above the non-linear threshold for absorption, in order for refractive index changes to occur in the material. Examples of focusing optics includes (but are not limited to) single lenses, microscope objectives of various numerical aperture, scanning lenses like f-theta lenses, or diffractive optics.

Adaptive optics can be used to further shape the beam intensity to achieve the desired intensity threshold at the focused spot.

The laser is configured to deliver short pulses of a peak-power that reaches the limit for non-linear threshold for absorption in the material. Typical suitable pulse durations range from a few femtoseconds to a few picoseconds. The choice of pulse duration can differ depending on the material used, according to the threshold intensity required.

The polarization of the laser beam can be chosen through various states, like linear, circular, radial, azimuthal or a combination of these states, in order for instance to minimize or zero the stress that may build up in the material for certain materials. The system includes polarization elements such as quarter and half-wave plates permitting these polarization states of the laser light to be obtained.

The controller is configured to control displacement of the system elements such as the displacement stages or positioners to spatially displace the laser spot, for example, across the material or sample, and to focus the laser spot at different depths inside the material or substrate.

Alternatively or additionally, the refractive index change generating system includes a substrate or material holder, a controller and displacement stages or positioners configured to displace the holder. The controller is configured to displace the displacement stages or positioners to spatially displace the holder and the material relative to the laser spot, for example, to allow the laser spot to be displaced across the material or sample, and to allow the laser spot to be focused at different depths inside the material or substrate.

The calculator or processor of the system is configured to command the above-mentioned controller or controllers using a system control algorithm or program stored in a memory (semiconductor memory or flash memory) or storage means of the system.

The refractive index change generating system is configured to generate changes in refractive index value in the material by displacing the laser spot across and in the material to generate the desired refractive index change pattern. The changes in refractive index value in the material can be carried, out, for example by the refractive index change generating system determining a timestamp t and a plurality of points on the material, and displacing the laser spot between the plurality of points such that it will be at a position pn at time nt.

The refractive index change generating system is, for example, configured to generate the changes in refractive index value in the material by displacing the material and/or laser spot such that the laser focal point or spot visits every point in the material just once.

The refractive index change generating system is, for example, configured to displace the laser spot in the material in a layer by layer (or thickness level by thickness level) manner from the bottom up in a raster scan style.

The refractive index change generating system is, for example, configured to control the amount of energy deposited at each point or location in the material by varying the speed of movement of the laser spot relative to the material or substrate while the laser pulses are emitted at a constant rate and/or duration.

The calculator or processor is configured to determine the changes in a refractive index value using, for example, the Born approximation method or alternatively or additionally using a standard Lippmann model. The memory or storage means of the multi-spectral image printing or recording system includes a program or algorithm configured to determine the changes in a refractive index value, for example, as described in this disclosure, for example to apply the Born approximation method and/or the standard Lippmann model that is executed by the calculator or processor to determine the changes in a refractive index value that permit a predetermined multi-spectral image to be produced when the material comprising these changes in a refractive index value is illuminated.

The system is configured, for example, for the desired refractive index pattern to be calculated for each spatial location by using a Lippmann-style closed form analytic expression. The desired refractive index pattern can be iteratively calculated to reduce the error between the predicted reflected multi-spectral image and the desired multi-spectral image. For example, one possibility is to initialize with the result of a Lippmann-style closed form analytic expression.

The memory or storage means can also include a program or algorithm configured to apply a forward model to refine the determined refractive index change. The calculator or processor is configured to carry out the refining using a forward model configured to calculate a reflected spectrum from the determined refractive index change, by executing this program or algorithm.

The system is configured to then use the determined refractive index change to determine the laser spot positioning and characteristics to generate the determined refractive index change in the material for recording the image therein.

According to another aspect, the controls are calculated such that the laser focal point scans each point of the 3D substrate for the same amount of time and the laser intensity is adjusted to create the desired refractive index change.

In another aspect, the controls are calculated such that the laser intensity is constant and the focal point scans each point of the 3D substrate resting at each point long enough to create the desired refractive index change.

In another aspect, the controls are calculated such that both the laser intensity and rest time is varied to create the desired refractive index change.

The controls to scan the beam can be diverse. Any methods for the control that can accurately position the laser beam within the volume of the material is suitable for the process. The accuracy should be in the range or smaller than the average wavelength of the spectral information to be stored. Examples of suitable controls include among others, galvanometers scanners, polygon scanners, and/or moving stages that can be actuated with piezoelectric means, linear motors, stepper motors or any suitable means with the required accuracy for encoding spectral information.

The laser beam optics needs to focus the laser intensity so that the intensity can locally be above the non-linear threshold for absorption, in order for refractive index changes to occur. Examples of focusing optics includes (but are not limited to) single lenses, microscope objectives of various numerical aperture, scanning lenses like f-theta lenses, or diffractive optics. Adaptive optics can be used to further shape the beam intensity to achieve the desired intensity threshold at the focused spot.

The laser needs to deliver pulses short enough so that the peak-power reaches the limit for non-linear threshold for absorption in transparent materials. Typical suitable pulse duration ranges from a few femtoseconds to a few picoseconds. The choice of pulse duration may differ from one material to another one, according the threshold intensity required.

The polarization of the laser beam can be chosen through various states, like linear, circular, radial, azimuthal or a combination of these states, in order for instance to minimize or zero the stress that may build up in the material for certain materials.

The spectrum recorded can span from the UV range to the visible range or to the mid and far infrared.

The multi-spectral image printing system uses for example femto-second lasers to print interference patterns to reflect light throughout the full visible spectrum.

Femto-second lasers can change the index of refraction of different materials.

This ability has already been exploited to print Bragg gratings [8,9] and for data storage [10,11,12,13]. The name, femto-second, comes from the fact that the duration of the pulse of the laser is extremely short (of the order of femto-seconds). Such lasers can produce very high powers while using reasonable overall energy.

Typically, electromagnetic waves pass through transparent materials without modifying the material; however, when a region of the material is subjected to a sufficiently high peak power electromagnetic wave, it causes permanent non-linear effects. In the present case, the laser causes the index of refraction of the material to increase. This increase in refractive index upon femtosecond laser exposure has been demonstrated in various transparent substrates. It includes not only a variety of glass, such as fused silica, borosilicates or other more exotic glass compositions, but also polymers and some crystals. Such non-linear effects can also be triggered in organic materials. Note that for each different material, the laser parameters are optimized to reach the highest possible increase in the index of refraction. The physical mechanism leading to this increase in refractive index can also be of different nature ranging from subtle compositional changes at the laser foci or localized densification effects.

The change in refractive index only happens in the region of very high intensity, i.e. where the laser focuses. This region is a finite size ellipsoid rather than a point that can be tuned with the correct optics and laser power. The energy profile of the laser is a Gaussian; however, the ellipse has sharp edges. Then, depending on the laser power, the refractive index change inside the ellipse is modified in one of two regimes as previously mentioned in relation to FIG. 2.

These ellipses (further illustrated in FIG. 3) can be used or combined in such a way that the changes of refractive index causes incident white light to be reflected in such a way that it interferes to produce the desired spectrum at each point in the image.

This refractive index change is small. For example, for silica, the laser can increase the refractive index by about $10^{-3}$ larger than its original value (approximately 1.45). However, by printing many layers a significant portion of the incident light can be reflected.

To be able to print the desired pattern, the focal point of the laser is moved to different points in the substrate. This can be done to the required precision with standard piezo-stages.

Ultra-fast lasers can be used to locally modify the refractive index of the material such as glass, and the algorithm to calculate the desired refractive index change will now be discussed.

Given a digital multi-spectral image (this is represented for example as a 3D cube in FIG. 1(a), with two dimensions used to describe the spatial dimensions and the third dimension used to describe the spectral information. For example, if the x and y dimensions are used to describe the spatial information and the z dimension is used to describe the spectral information, the (x,y,z)-th voxel gives the value of the pixel (x,y) for the z-th wavelength), it is calculated how to change the index of refraction to reproduce this spectrum. As mentioned previously, the change in the refractive index of the glass is by at most $10^-$. Therefore, the changes of refractive index will lead to small amounts of light been reflected. However, by printing many layers comprising refractive index changes, these small changes will add up and thus the modified substrate will reflect a large percentage of the light incident on it. This is very similar to traditional Lippmann photography, where each individual grain reflects a very small amount of light but, in total, a large percentage of light is reflected by many grains through the depth.

When analyzing traditional Lippmann photography, it is normally assumed that the reflectivity of the plate is modified during the recording process. One exception to this is the model used by Nereid and Pederson [14], which in contrast assumes that it is the index of refraction that is altered during the recording process. This model is particularly suited to modelling the reflection from interference patterns printed with femto-second lasers.

The algorithm to calculate the desired refractive index change solves an inverse problem to that of the forward model that calculates the reflected spectrum from a particular refractive index change.

The reflected spectrum from a given refractive index distribution, printed in a substrate, can be estimated using standard optics simulation software and algorithms. For example, in reference [14] the contents of which are fully incorporated herein by reference, two methods are proposed for modelling the forward operation. The first is the so called Born approximation and assumes that the change of the index of refraction is very small.

The second method assumes that the plate can be divided into thin regions of constant index of refraction, with sharp boundaries. Then the propagation is solved in each region separately and boundary conditions are matched using matrix multiplication (it is an example of Matrix theory). Below, we use this second approach due to its simpler matrix implementation. However, the framework developed is flexible enough to use other and different forward models.

To solve this inverse problem, we used the following method or strategy. For each pixel of the image, we calculate a first approximation of the desired refractive index change, using the standard Lippmann model:

$$\varepsilon\{U\}(z) \propto \int_0^\infty P(\omega)\left(1 + \cos\left(\frac{2\omega z}{c}\right)\right)d\omega.$$

Here $\varepsilon\{U\}(z)$ is the desired refractive change at the point z through the depth, $P(\omega)$ is the desired spectrum for the pixel as a function of angular frequency $\omega$ and c is the speed of light in the medium.

We then iteratively refine this first approximation using the forward model previously mentioned.

To use this standard approach, we model the substrate as L thin layers located at depths $z=0, \Delta z, 2\Delta z, \ldots, (L-1)\Delta z$, each with a constant refractive index. As described by the Fresnel equations for normal incidence, the interface between two layers with different indices of refraction creates reflection. For two layers (l and l+1), this can be represented using the following matrix transfer function:

$$M(l) = \frac{1}{2n_{l+1}}\begin{bmatrix} n_l^* + n_{l+1}^* & n_l - n_{l+1} \\ n_l^* - n_{l+1}^* & n_l + n_{l+1} \end{bmatrix}$$

Here, $n_l$ and $n_{l+1}$ are the refractive indices at layers l and l+1, respectively.

The total wave-transfer matrix describing all L layers, for a given wavenumber k, is given by $$M_{tot}(k) = \sum_{l=0}^{L-1} \begin{bmatrix} e^{-jn_l k\Delta z} & 0 \\ 0 & e^{jn_l k\Delta z} \end{bmatrix} M(l),$$

where $\Delta z$ is the thickness of each layer.

Given this wave transfer matrix, we can calculate the reflected and transmitted waves from the substrate using $$\begin{bmatrix} U_2^+(k) \\ U_2^-(k) \end{bmatrix} = \underbrace{\begin{bmatrix} m_{11}(k) & m_{12}(k) \\ m_{21}(k) & m_{22}(k) \end{bmatrix}}_{M_{tot}(k)} \begin{bmatrix} U_1^+(k) \\ U_1^-(k) \end{bmatrix},$$

for each wavenumber k.

Here, $U_1^+(k)$ and $U_1^-(k)$ represent the wave on the left side of the substrate and $U_2^+(k)$ and $U_2^-(k)$ the wave on the right side. Furthermore, $U_1^+(k)$ describes a forward wave (travelling from left to right towards the substrate) and $U_1^-(k)$ is a backward wave (travelling away from the substrate). Similarly, $U_2^+(k)$ characterises a forward wave travelling left to right away from the substrate and $U_2^-(k)$ a backward wave travelling towards the substrate.

In our case, we assume that the substrate is illuminated from one side (say the left) with no illumination from the other (in practice we can block light entering the other side of the substrate).

We thus calculate the reflected wave $U_1^-(k)$, given the incident wave $U_1^+(k)$, for each wavenumber k, under the assumption that $U_2^-(k)=0$:

$$U_1^-(k) = -\frac{m_{21}(k)U_1^+(k)}{m_{22}(k)}.$$

Figure 5:
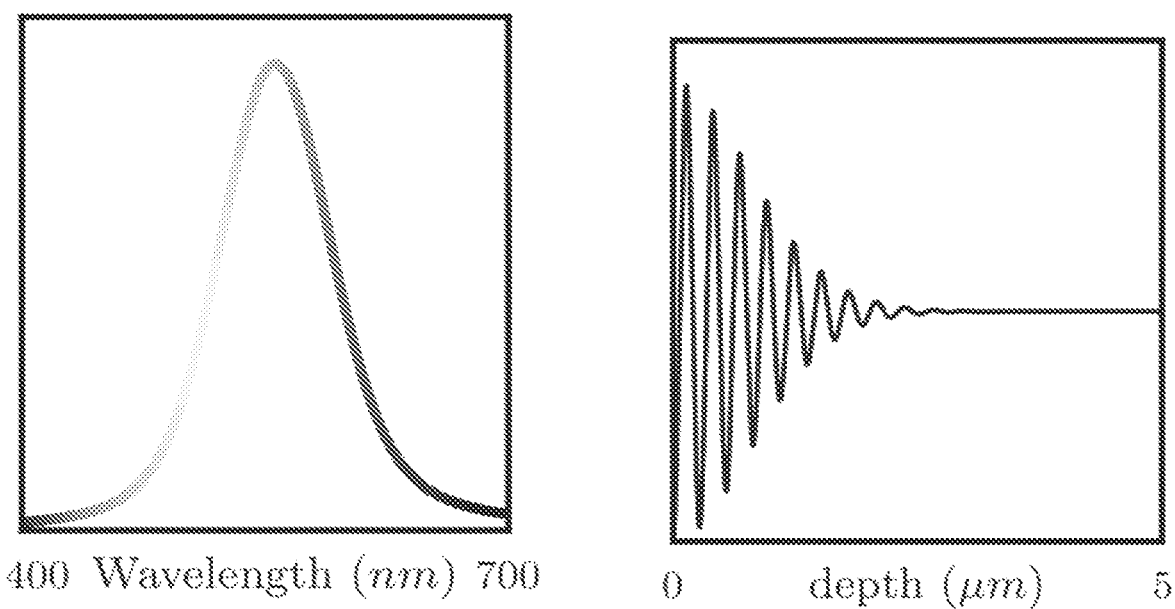
FIG. 5 shows an exemplary input spectrum (left) and the resulting desired refractive index change (right) permitting to produce this spectrum.

For example, FIG. 5 depicts an example of the desired refractive index change required to produce a particular spectrum shown on the left of FIG. 5.

In summary, to estimate the desired refractive index change to reproduce a particular spectrum, the simplest approach is to take a coherent plane wave with the desired spectrum and calculate the interference pattern created from this coherent plane wave reflected back on itself. This interference pattern provides a naive estimate of the desired refractive index change.

One can also simulate what light spectrum would be reflected from a substrate with a particular refractive index distribution. Therefore, an iterative approach can be used to refine an estimate of the desired refractive index distribution. To do this, the current estimate is iteratively modified such that the simulated reflected spectrum becomes closer to the desired reflected spectrum.

There are many ways to simulate what light spectrum would be reflected from a substrate with a particular refractive index distribution, including advanced off the shelf optics simulation packages and simple wave-transfer matrices. Wave-transfer matrices provide a simple way to model the light transmitted, absorbed and reflected from stacked optical phenomena (see reference [15] for a textbook description). In our case, the reflection from thin layers of different refractive indices can be easily estimated by alternatively stacking two matrix types: one for a semi-transparent reflection and a second for the transport of light over a thin homogenous strip with a particular refractive index.

As previously mentioned, given the desired refractive index change, the system includes an algorithm or program to calculate, for example, piezo and laser commands. This permits the material or substrate to undergo the required refractive index change.

Given the desired or determined refractive index change, a second algorithm, as shown in FIG. 1(d), calculates how to move elements of the system, for example, the piezo stations to print the desired pattern in the material or substrate. In addition, the algorithm is also configured to turn the laser on and off as required.

The piezo stations, used, take, for example, as input a timestamp t and a table of points p. It then moves between those points to attempt to be at a position $p_n$ at time nt. This allows the laser spot to be displaced relative to the material or substrate and for the refractive index change to be produced across the material or substrate in, for example, X, Y and/or Z directions.

There are however, many, essentially equivalent, ways to move the laser through the substrate to print a particular pattern.

The aim being that the focal point of the laser is moved through the substrate so that each region receives the desired amount of energy to create the correct amount of modification.

One exemplary basic approach, is to move the substrate and laser such that the laser focal point visits every point in the substrate just once. This can be done layer by layer from the bottom up in a standard raster scan style: one can go scan bottom up so that the laser does not pass through glass that has already been modified (the laser scans from above). To control the amount of energy deposited at each point in the glass, one varies the speed of movement (the laser pulses are at a constant rate and/or duration).

More advanced scanning strategies, would reduce the amount of time the laser is off and thus contribute to speeding up printing. For instance, the beam could be rasterized at a constant speed but modulated in intensity and number of pulses for instance using acousto-optics-modulators (AOM) or Pockels cells.

While the invention has been disclosed with reference to certain preferred embodiments, numerous modifications, alterations, and changes to the described embodiments, and equivalents thereof, are possible without departing from the sphere and scope of the invention. The features of any one of the described embodiments may be included in any other of the described embodiments. Accordingly, it is intended that the invention not be limited to the described embodiments and be given the broadest reasonable interpretation in accordance with the language of the appended claims.

REFERENCES

1. [1] G. Lippmann, "La photographie des couleurs," Comptes Rendus Hebdomadaires à l'Académie Des Sciences, vol. 112, pp. 274-275, 1891.

2. [2] "Sur la théorie de la photographie des couleurs simples et composées par la méthode interferentielle," Journal de Physique Théorique Appliquée, vol. 3, no. 1, pp. 97-107, 1894.

3. [3] H. Ives, An Experimental Study of the Lippmann Color Photograph. John Hopkins University, 1908.

4. [4] J.-M. R. Fournier, R. Benjamin, R. Alexander, L. Paul, L. Burnett, E. Sarah, and E. Stamper, "Recent developments in Lippmann photography," in SPIE 3358, Sixth International Symposium on Display Holography, 1998, pp. 95-102.

5. [5] H. I. Bjelkhagen, "Super-realistic-looking images based on colour holography and Lippmann photography," The International Society for Optical Engineering, 2002.

6. [6] "Lippmann photography: its history and recent development," The PhotoHistorian, pp. 11-19, 2003.

7. [7] H. I. Bjelkhagen and D. Brotherton-Ratcliffe, Ultra-Realistic Imaging: Advanced Techniques in Analogue and Digital Colour Holography. CRC Press, 2013.

8. [8] G. D. Marshall, M. Ams, and M. J. Withford, "Direct laser written waveguide-bragg gratings in bulk fused silica," Opt. Lett., vol. 31, no. 18, pp. 2690-2691, September 2006. [Online]. Available: http://ol.osa.org/abstract.cfm?URI=ol-31-18-2690

9. [9] G. D. Marshall, R. J. Williams, N. Jovanovic, M. J. Steel, and M. J. Withford, "Point-by-point written fiber-bragg gratings and their application in complex grating designs," Opt. Express, vol. 18, no. 19, pp. 19 844-19 859, September 2010. [Online]. Available: http://www.opticsexpress.org/abstract.cfm?URI=oe-18-19-19844

10. [10] E. N. Glezer, M. Milosavljevic, L. Huang, R. J. Finlay, T.-H. Her, J. P. Callan, and E. Mazur, "Three-dimensional optical storage inside transparentmaterials," Opt. Lett., vol. 21, no. 24, pp. 2023-2025, Dec 1996. [Online]. Available: http://ol.osa.org/abstract.cfm?URI=ol-21-24-2023

11. [11] L. Canioni, M. Bellec, A. Royon, B. Bousquet, and T. Cardinal, "Three-dimensional optical data storage using third-harmonic generation in silver zinc phosphate glass," Opt. Lett., vol. 33, no. 4, pp. 360-362, February 2008. [Online]. Available: http://ol.osa.org/abstract.cfm?URI=ol-33-4-360

12. [12] J. Zhang, M. Gecevicius, M. Beresna, and P. Kazansky, "Seemingly unlimited lifetime data storage in nanostructured glass," Phys. Rev. Lett., vol. 112, p. 033901, Jan 2014. [Online]. Available: https://link.aps.org/doi/10.1103/PhysRevLett.112.033901

13. [13] J. Zhang, A. Cerkauskaite, R. Drevinskas, A. Patel, M. Beresna, and P. Kazansky, "Eternal 5D data storage by ultrafast laser writing in glass," Proc. SPIE, vol. 9736, pp. 9736-9736-16, 2016. [Online]. Available: http://dx.doi.org/10.1117/12.2220600

14. [14] H. Nareid and H. M. Pedersen, "Modeling of the lippmann color process," JOSAA, vol. 8, no. 2, pp. 257-265, 1991.

15. [15] B. E. A. Saleh and M. C. Teich, Fundamentals of photonics. Wiley New York, 1991, vol. 22.

16. [16] S. Maruo and K. Ikuta, "Three-dimensional microfabrication by use of single-photon-absorbed polymerization," Applied Physics Letters 76, 2656-2658 (2000).

17. [17] M. Thiel, J. Fischer, G. von Freymann, and M. Wegener, "Direct laser writing of three-dimensional submicron structures using a continuous-wave laser at 532 nm," Applied Physics Letters 97, 221102 (2010).

The entire contents of each one of the above references is herewith incorporated by reference.

The invention claimed is:

1. A multi-spectral image printing method including the steps of:
providing a multi-spectral image, wherein the multi-spectral image includes two dimensions used to describe spatial dimensions and a third dimension used to describe spectral information;
providing a material whose refractive index is modified using electromagnetic radiation to print the multi-spectral image;
determining changes in a refractive index value or refractive index values of the material permitting to reproduce the multi-spectral image when the material is illuminated; and
generating the changes in refractive index value in the material using the electromagnetic radiation.

2. The method according to claim 1, wherein the multi-spectral image is a digital multi-spectral image and stored as a digital multi-spectral image in the material.

3. The method according to claim 1, wherein the printed digital multi-spectral image includes stored information or data.

4. The method according to claim 1, wherein the changes in refractive index value are generated in the material to cause incident light to be reflected and interfere to produce a desired spectrum for points of the multi-spectral image.

5. The method according to claim 1, wherein the changes in refractive index value are generated in the material to produce a plurality of superimposed layers or regions inside the material in which the material refractive index is modified.

6. The method according to claim 1, wherein the changes in refractive index value are generated using electromagnetic radiation provided by an ultra-fast laser.

7. The method according to claim 1, wherein the changes in refractive index value are generated in the depth of the material.

8. The method according to claim 1, wherein the changes in refractive index value are generated in a focal region of a laser when an energy level in the focal region exceeds a first threshold value.

9. The meethod according to claim 1, wherein the changes in refractive index value are generated in a focal region of the laser when an energy level in the focal region exceeds a second threshold value to define a modulated energy profile having an orientation determined by a polarization of the laser.

10. The method according to claim 1, wherein a same or a similar change in refractive index value is generated at different thicknesses of the material to increase the reflected intensity at a given wavelength or spectral range.

11. The method according to claim 1, wherein the material comprises or consists of a glass, a crystal, a polymer or organic material.

12. The method according to claim 1, wherein the changes in a refractive index value is calculated using the Born approximation method.

13. The method according to the previous claim 12, wherein refining is carried out using a forward model calculating a reflected spectrum from the determined refractive index change.

14. The method according to claim 1, wherein the changes in a refractive index value is calculated using a standard Lippmann model.

15. The method according to the previous claim 14, wherein refining is carried out using a forward model calculating a reflected spectrum from the determined refractive index change.

16. The method according to claim 1, wherein the changes in refractive index value in the material are generated by displacing a laser spot across and in the material to generate the desired refractive index change pattern.

17. The method according to claim 1, wherein the changes in refractive index value in the material are generated by providing a timestamp (t) and a plurality of points (p) on the material, and displacing a laser spot between said points in such a way that it will be at a position pn at time nt.

18. The method according to claim 1, wherein the changes in refractive index value in the material are generated by displacing the material and a laser spot such that a laser focal point or spot visits every point in the material just once.

19. The method according to claim 1, wherein the laser spot is displaced in the material in a layer by layer manner from the bottom up in a raster scan style.

20. The method according to claim 1, wherein an amount of energy deposited at each point or location in the material is controlled by varying a speed of movement of a laser spot, wherein laser pulses are emitted at a constant rate.

* * * * *